United States Patent [19]
Frush

[11] 3,997,876
[45] Dec. 14, 1976

[54] APPARATUS AND METHOD FOR AVOIDING DEFECTS IN THE RECORDING MEDIUM WITHIN A PERIPHERAL STORAGE SYSTEM

[75] Inventor: Donald Irwin Frush, Los Gatos, Calif.

[73] Assignee: International Business Machines Corporation, Armonk, N.Y.

[22] Filed: May 6, 1975

[21] Appl. No.: 596,321

Related U.S. Application Data

[63] Continuation of Ser. No. 395,473, Sept. 10, 1973, abandoned, which is a continuation-in-part of Ser. No. 260,684, June 7, 1972, abandoned.

[52] U.S. Cl. .............................. 340/172.5; 360/27; 360/50
[51] Int. Cl.[2] .................... G06F 7/22; G06F 11/00
[58] Field of Search ........... 340/172.5; 360/27, 53, 360/38, 50

[56] References Cited
UNITED STATES PATENTS

| | | | |
|---|---|---|---|
| 2,702,315 | 2/1955 | Roderick | 360/13 |
| 2,793,344 | 5/1957 | Reynolds | 360/27 |
| 2,817,829 | 12/1957 | Lubkin | 360/51 |
| 2,937,368 | 5/1960 | Newby | 340/172.5 |
| 2,975,407 | 3/1958 | O'Brien | 360/50 |
| 3,054,990 | 9/1962 | Noonan | 360/50 |
| 3,088,101 | 4/1963 | Schrimpf | 360/53 |
| 3,444,541 | 5/1969 | Irwin | 360/50 |
| 3,490,013 | 1/1970 | Lawrance | 360/39 |
| 3,588,855 | 6/1971 | Scully | 360/50 |
| 3,771,143 | 11/1973 | Taylor | 340/172.5 |

OTHER PUBLICATIONS

W. Janus, "Skip of Magnetic Tape Defect Area", pp. 1413–1414 IBM Technical Disclosure Bulletin, vol. 13, No. 6, Nov. 1970.
O. R. Luhrs, "Write Check Gaps", IBM Technical Disclosure Bulletin, vol. 13, No. 10, pp. 2972–2973, Mar. 1971.

*Primary Examiner*—Joseph M. Thesz
*Attorney, Agent, or Firm*—R. Bruce Brodie

[57] ABSTRACT

Apparatus and a method for controlling the reading and writing operation of a peripheral storage system such that a magnetic recording medium, having small defective areas in the magnetic surface at which data cannot be reliably recorded may be used. Each data track on the magnetic recording medium has a reserve capacity which is used as a special gap. The recording medium is initialized such that the distance from a point of origin to a surface defect in each track is recorded in a header area in each track. The apparatus and method herein described cooperate with this initialized magnetic recording medium so as to control the format of data recorded onto the magnetic recording medium such that any defect in the recording medium will not affect a reading or writing operation of the storage system. The apparatus and method will cause the distance between a reference point in each record to the defect within the track at which the record is being recorded to be recorded in a control field at the beginning of that record. The apparatus and method monitors the distance recorded in descending terms within the records recorded on a given data track such that during a write operation the write sequence is altered so that the special gap will approximately be centered over the defect if the defect is to affect information recorded in that record. During a read operation, if the surface defect is to affect the record being read, the system will recognize the special gap which has been recorded over the defect and accept that information as non-data information, therefore, making the system transparent to the defect. Effectively, the apparatus and method allow the movement of the special gap to any position within the data track such that a defect may be made transparent to the operating storage system.

9 Claims, 15 Drawing Figures

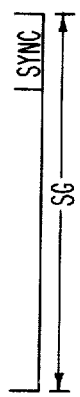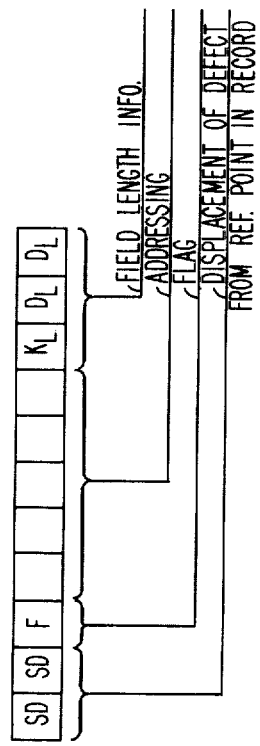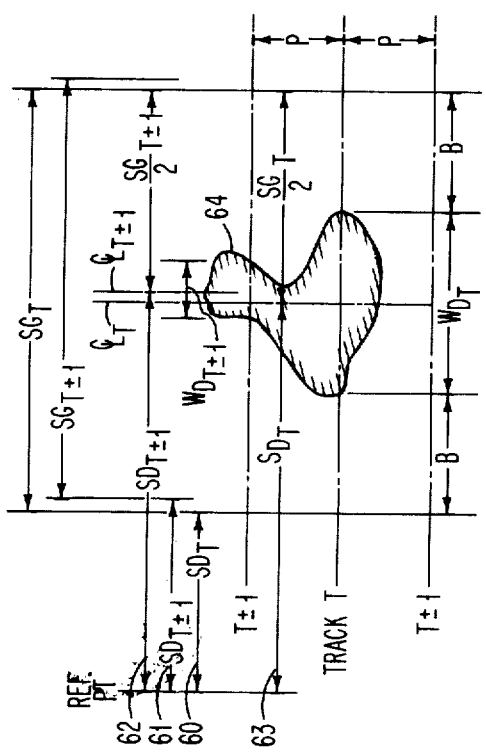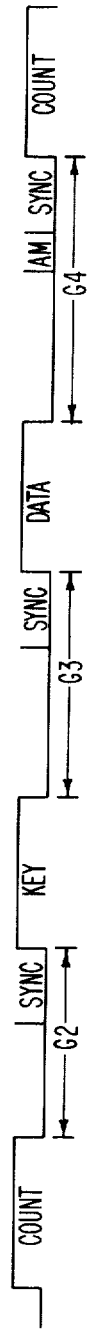

APPARATUS AND METHOD FOR AVOIDING DEFECTS IN THE RECORDING MEDIUM WITHIN A PERIPHERAL STORAGE SYSTEM

CO-PENDING APPLICATIONS

This application is a continuation of application Ser. No. 395,473 (now abandoned) filed on Sept. 10, 1973, in the name of Donald I. Frush, entitled "Apparatus and Method for Avoiding Defects in the Recording Medium Within A Peripheral Storage System". The application Ser. No. 395,473 was, in turn, a continuation in part of application Ser. No. 260,684 (now abandoned) filed on June 7, 1972, also in the name of Donald I. Frush and entitled "Apparatus and Method for Providing Defect Free Operation in Peripheral Storage Apparatus". All of the applications are assigned to the same assignee.

BACKGROUND OF THE INVENTION

In modern day computer systems, a central processing unit, or CPU, possesses instructions and data, most of which, due to the main storage limitations within the CPU, are stored in one or more peripheral storage devices external to the CPU. A CPU may be connected to a data channel which, in turn, is connected to the peripheral storage device by way of a storage control unit. Alternately, the CPU may be directly connected to the storage control device by ways of controlled circuitry internal to the CPU itself.

One type of peripheral storage device in common use is the magnetic disk storage drive. In the manufacture of disks for such devices, the yield is such that a certain number of disks manufactured will contain surface defects which, in the past, render the disk unfit for data recording. In the more recent past, such defective disks were rendered usable by flagging data tracks which contain such defects and recording data normally assigned to these defective tracks on alternative tracks. Each defect, therefore, disabled an entire data track which was then flapped as defective, even though the defect may have been contained in only a relatively small area of the track. This solution was wasteful of space, and furthermore, there were only a few alternate tracks available for defective track assignments. Therefore, the number of disk defects affecting unique tracks that could be tolerated was equal to the number of alternative tracks available for this solution.

Another approach to avoid the defects in the recording media in a disk storage system, was to allocate a space record length on each data track for the purpose of recording a record that would be affected by a defect in its normal recording area. This approach called for the records being of fixed length and for each track to have a spare record for possible use. The defective record on each track was identified by a flag bit at the beginning of that record which in turn caused the record to be automatically transferred to the spare record for that track. In order to practice this method of defect avoidance, the user must give up a percentage of recording area equal to one record length. Therefore, if there were to be five records on each data track, then 20% of the usable area on the disk would be dedicated to the defect avoidance scheme.

Another type of peripheral storage device is the commonly used magnetic tape storage drive. Classicly, defect avoidance has taken the approach of having a spare track on the tape which carries information as to the availability of the magnetic surface of an area across the tape as defined by each data bit in the avoidance track. Therefore, in using the method, one must give up one recording track in order to provide the defect avoidance scheme. This defect marker inhibits the writing or reading of any information in all data tracks across the magnetic tape whenever the defect mark is sensed during a read or write operation. Therefore, data tracks that did not have the defect associated with it are affected the same as if the defect was in fact present. This approach by use of a special defect track, provides for the avoidance of multiple defects per track along the length of the magnetic tape.

Another approach within the magnetic tape art for defect avoidance is that when a defect is encountered within a record, the magnetic tape be backspaced to the beginning of the record that is affected and then a certain length of tape is erased to form a gap and thereafter the record is re-recorded. If the defect still affects the newly recorded record, then the tape is again backspaced to the beginning of the now re-recorded record and again the same length of area is erased to provide an extension of the original erased area. The record is then again re-written and this process continues until the record is so placed that the defect does not affect the record. The area of magnetic recording surface that is utilized in this defect avoidance scheme is a variable according to where the defect is located with regard to the record being recorded. It can be understood that if the defect is at the end of a very long record, the erased area would in necessity have to be almost as long as the original record length in order to avoid this defect. This method calls for a trial and error approach for avoiding the defect and can be a time consuming process.

Accordingly, it is the primary object of my invention to provide control apparatus for controlling the read and write operations of a storage system to cooperate with the initialized magnetic medium such that the greatest efficiency of magnetic media surface usage may be obtained while making the system transparent to defects during a read/write operation.

Another object of my invention is to provide a method which dynamically allocates the reserved special gap such that defects on the recording media will be placed in such a relationship with the special gap that the defect will not affect usable information recorded on the recording media.

Another object of my invention is the method of avoiding defects in a record during a read operation and for predicting the distance to the defect for the next record to be read or written during the read processing of that record.

It is yet another object of my invention to provide apparatus and method for making the most efficient utilization of the system time by allowing the location of the defect to be predicted and therefore avoiding the trial and error scheme of previous systems.

SUMMARY OF THE INVENTION

The apparatus and method described herein will be primarily directed towards disk drive storage systems since it is in that environment that the invention finds its highest probable usage. It should be noted that the invention may be adapted to any magnetic storage medium in which the information is recorded in a serial manner along data tracks on the recording medium. It will be appreciated by those of ordinary skill in the art that this problem and the solutions afforded by our invention, are applicable not only to disk drives, but are further applicable to defect problems in magnetic tape systems and other similar systems wherein information is recorded on media.

The apparatus and method coacts with recording media that has been initialized to contain a certain format of information recorded thereon. The magnetic media has recorded after a given reference mark the distance from that reference mark to the defect, if any, that affects that data track. Each data track has a reserve capacity equal in length to a special gap which will be placed over the defect by the apparatus such that the effect of the defect will become transparent to the storage system.

The method interrupts the normal write sequence during a write operation so that a special gap will be written, so that the defect is approximately centered in the special gap, to insure that the defect does not affect the data written onto the magnetic media. The method also controls the write operation to record into the control field of each record the distance from a reference point in that record to the point of the defect on that track. This information within the control field of the record indicates whether or not the defect has been passed and therefore, whether the record will or will not be affected by the defect on that track. The method further calls for the storing of the defect distance stored in the control field of each record as it is being read. The defect distance is therefore used to identify the location of the special gap within the record if that record is affected by the defect such that the special gap written into the record during the write operation will be received as non data. The defect distance is also used to generate a predicted value of the defect distance for the next record from a point of reference in that next record to the point of defect. The method therefore controls the read circuitry such that when the defect passes beneath the transducing element, this information will be recognized as non-data information and will be treated as such.

The method generates a format of records such that within the control field of each record, there exists the defect distance from a point in each record to the defect on the track. This defect distance will appear as a series of descending numbers starting from the point of reference having the highest number to the record having the defect and all records thereafter having the defect distance of zero, which is interpreted to mean that the defect has passed and is in fact not affecting the record to be read.

Two embodiments of the apparatus are disclosed within this specification. The first embodiment is directed to a system which records records in series and which does not contain any specific formatting other than the necessity of having a header field after a point of reference recorded on the medium where the media is preinitialized such that the defect distance is recorded after the reference point in that header field. The apparatus describes the generation of the necessary controlled signals for interrupting the normal read or write sequence of the peripheral unit such that the control field of each record will contain the distance from a point in each record to the defect and the writing of the special gap if necessary during a write operation and the detection and avoidance of the special gap during a read operation.

A second embodiment is directed to the specific formatting of data in a count-key-data format for each record recorded on the data track. In this embodiment, the formatting scheme contains gaps between the count, key and data fields of each record and therefore the necessity of having more complex control signals for generating the proper signals for determining when the special gap is to be written or read. The apparatus in this embodiment further contains decision-making logic for moving the fields within the record, spatially translating, or for dividing a field into two segments, bifurcating the record, in accordance with criteria for making the most efficient usage of the surface area of the medium while also creating maximum efficient operation of the overall read write operations.

The foregoing and other objects, features and advantages of my invention will be apparent from the following more particular descriptions of the preferred embodiments of the invention as illustrated in the accompanying drawings.

BRIEF DESCRIPTION OF THE DRAWINGS

FIG. 4 is a detailed representation of one manner in which the special gap of my invention can be related to recording media surface defects.

FIG. 5 is a representation in linear fashion of a typical data track on a disk storage device useful in my invention.

FIG. 6 is a representation of the count-key-data format of a data record with which my invention can be used.

FIG. 7 represents the length and contents of a special gap.

FIG. 8 is a detailed representation of the count-field of the data track showing the skip displacement and flag field useful in my invention.

FIG. 9 is a detailed representation located within the allocation of flag bits in the flag field of the count-field of FIG. 8.

DETAILED DESCRIPTION OF THE PREFERRED EMBODIMENTS

Figure 1:
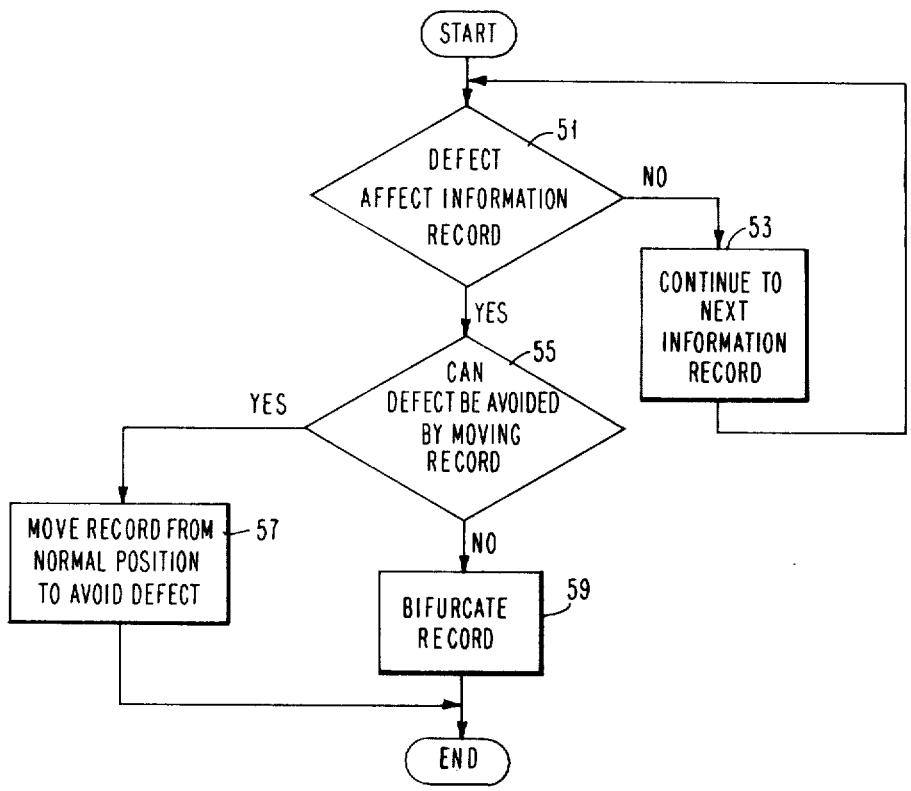
FIG. 1 is a generalized description in flow-chart fashion of the basic method of my invention.

Referring to FIG. 1, there is seen a generalized flow chart of the basic method of my invention. As a record is to be written on or read from the track, a decision is made at 51 to determine whether a surface defect will affect this record. If it will not, then this record is written on or read from the track and the process continues until the time when the next record is going to be written on the track. At that time, the same inquiry at 51 is made again. Ultimately, a point may be reached at which the defect is about to affect the record. If so, then a second inquiry is made at 55 to determine whether the defect has been or can be avoided during a write operation by moving the record down the track. If this decision is in the affirmative, then the record is recorded during the write operation, down track from where it normally would be recorded in order to avoid the defect. During a read operation, the apparatus recognizes that the record has been recorded further down the track than where it normally would have been recorded in order to avoid the defect. This is done by inserting a special gap SG between the end point of the previous record recorded and the start of the record that would have been affected by the defect. If, on the other hand, the inquiry at 55 is in the negative such that the defect cannot be avoided by moving the record down the track during a write operation then the record is bifurcated into two segments by placing the special gap into the record such that the special gap approximately centers over the defect, thereby isolating the effects of the defect from the data recorded in the record that would have been affected by the defect.

The detailed apparatus and steps for carrying forward the generalized method as described above will become evident from the hereafter description of the two embodiments of the invention. In order to properly understand the placement of the special gap SG on the data track, it is necessary to understand the relationship between the special gap SG and a defect. Turning now to FIG. 4, there is seen a defect shown illustratively at 64 to be a regularly shaped figure which represents a missing oxide or an embedded non-magnetic particle or other type of storage media defect. The defect distance from the reference point to the defect is SD. Three magnetic tracks, T, T ± 1 and T = 1, having a pitch P are shown for illustrative purposes. The defect length $WD_T$ relative to track T would be determined during storage media surface analysis. For this illustration, the defect is shown spanning another magnetic track, T ± 1. The measured defect length relative to track T ± 1 is $WD_{T \pm 1}$. Note that both $WD_{T \pm 1}$ and $SD_{T \pm 1}$ are different in length and displacement respecitvely than $WD_T$ and $SD_T$, even though all quantities are the results of a single physical defect. $SG_T$ and $SG_{T \pm 1}$ are equal in length but skewed because of a difference in the relative center line $\phi_T$ and $\phi_{T \pm 1}$. Thus, this invention is operative for defect spanning multiple as well as single magnetic tracks. The reference point can be, for example, the index point on the track or a point within the record such as the end of the control field as in the first embodiment or the end of the count-field of each record as in the second embodiment. The skip displacement SD for a given track begins at the reference point and can end at some appropriate point relative to the defect. For example, the end point could be the beginning of the defect or the end of the defect or substantially the center of the defect. Another end point for measuring the defect distance could be the beginning of the special gap if the special gap was centered over the center line of the defect such as $\phi_T$ or $\phi_{T \pm 1}$. It should be realized that the special gap length is a fixed known quantity and therefore, the ability to determine this reference point can easily be made. If the skip distance is to begin at the reference point and terminate at the center point of the defect, the resulting skip distances are shown by distances 63 and 62 respectively. If, on the other hand, the distance is measured to the beginning of the special gap, then the skip defect distance for the two tracks in discussion is shown by lines 60 and 61. Under normal conditions of storage media analysis, the maximum width of the defect WD is known. On manner of relating the special gap SG to the defect is to constrain the maximum width of the defect WD to be SG/N in length where N is greater than 2. The absolute length of special gap SG or defect WD an be assigned according to designer's choice based upon the characteristics of the using system, including clocking tolerances, mechanical tolerances and the like. In order to avoid the defect from having any effect on the recorded data around the defect, it is advisable to allow a minimum clearance G on either side of the defect as shown in FIG. 4. Therefore, the relationship between the defect WD and the special gap SG can be determined by setting the allowable defect width WD to be avoided by the system and then to assign some buffer area G to either side of the defect to avoid the defect from affecting data and using this information to determine the length of the special gap SG. In some systems, it may be necessary to append to the end of the special gap certain other information such as sync information for the purpose of maintaining the system in synchronization. Therefore, the total special ga SG length may consist of two times the buffer distance G plus the allowability defect width WD plus the necessary amount of length for the synchronization information S and this would define the standard length of the special gap to be used by the system. It is understood that the special gap can be configured in anyway that the designer so chooses and although the preceding description of the relationship of the special gap to the defect width is recommended, it is not critical to the invention.

During the initialization of the recording media, the defects are located and determined whether they are within the range of size of defects that may be avoided by the invention. If the defect is of the type to be avoided, the initialization process defect distance will be recorded in the first control field immediately following the reference point. This is such that the use of the reference point will define the location of the skip distance SP to be used during subsequent formatting operations during normal write processes of the storage system and thereby allow proper reading operations of the same system.

It can readily be seen that the index point and the first control field should not be affected by any defect on the recording media. This does not present a problem, however, since the index point is an arbitrary point and may be so picked on the recording media such that the index and first control field is not affected by a defect.

The two embodiments of the invention to be described hereafter relate to the control apparatus and method for generating the necessary command signals to the normal read/write controlling apparatus for co-acting with a recording media that has been initialized as heretofore discussed for the purpose of avoiding defects during the normal read/write process of the storage system.

Having now discussed the generalized method of the invention, the initialization of the storage media and the relationship of the special gap SG to the width of defects WD to be avoided by the system, a discussion will now be entered into as to the two embodiments of the invention.

First Embodiment — Apparatus and Method

Figure 2:
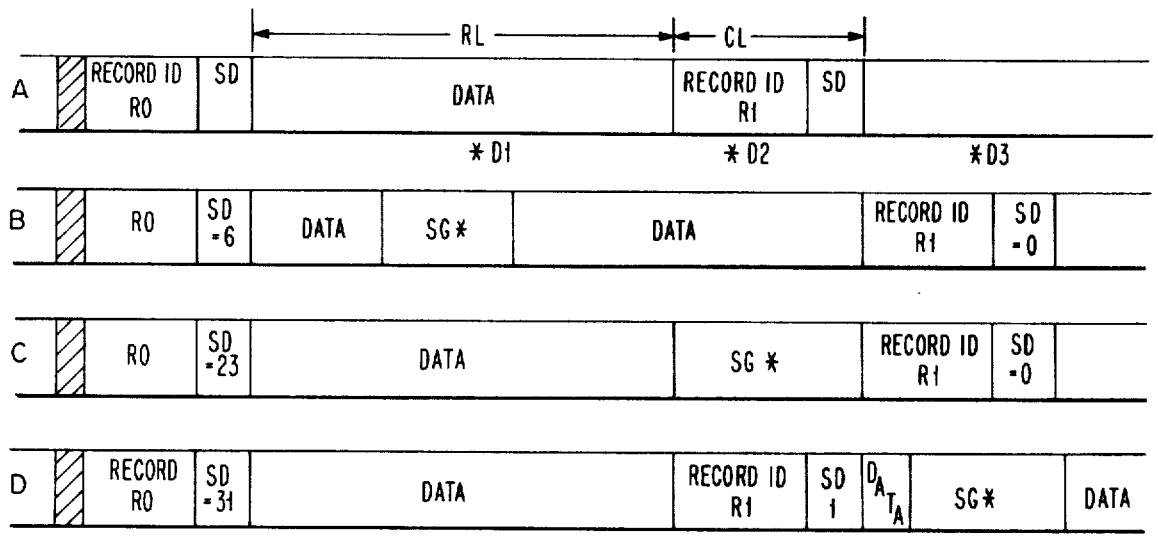
FIG. 2A illustrates the initialized data track on a recording media and the location of three defects for the purpose of examples.
FIG. 2B shows the resulting placement of the special gap due to a defect in the data field of record Ro.
FIG. 2C shows the resulting placement of the special gap when the defect appears in the control field of a record.
FIG. 2D shows the resulting placement of the special gap when the defect occurs in the data field of the following record.

The first embodiment of the invention is directed towards a system which records the records onto the media where each record is composed of a control field having a length CL and a variable data field having a length RL. The control field includes such information as the identification ID of the record and the skip displacement SD. The reference point for measuring the skip displacement SD from a record to the defect is from the end of the control field. FIG. 2A shows such a field. The hashed area on the record indicates a reference or index mark for the tracks. Shown with relationship to the media are the placement of three defects D1, D2 and D3. In operation, where the defect lies in the data field as is D1, the method and apparatus of this embodiment will cause the special gap SG to be centered over the defect D1 and cause the data field to be bifurcated into two components. This is shown in FIG. 2B. This embodiment uses the skip distance SD measured to the beginning of the special gap SG as previously described and as illustrated by distances 61 and 60 of FIG. 4. The skip defect distance is recorded as six units which is the unit distance from the end of the control field for record R0 to the beginning of the special gap. It should also be noted that record R1 and all records thereafter will have the SD record equal to zero which indicates that the defect with regards to that track has been passed and will not affect that record.

A defect which would normally lie in the next records' control field, as is illustrated by defect D2, will cause the following control field to be displaced further down the track by inserting the special gap SG between the ends of the data field of the preceding record and the start of the control field of the next records. This is shown by FIG. 2C. It should also be noted that the skip distance SD recorded in record R0 is equal to the data length which will automatically cause the special gap SG to be written at the end of the record R0 and thereby causing the defect to be located within the special gap SG. All records following record R0 will have the SD value equal to 0 indicating that that record is not affected by the defect with regard to that track.

FIG. 2D shows the results of having the defect located in a subsequent data field other than record R0, as shown by defect D3. The data field of record R1 is bifurcated to avoid defect D3. The skip distance in record R0 is 31 which is the distance from the end of the control field of record R0 to the beginning of the special gap SG. The skip distance of record R1 is equal to 1 which is the distance from the end of the control field for record R1 to the start of the special gap SG. It therefore can be seen that the skip distances in subsequent records decrease in value until the affected record is reached and thereafter the skip defect value will be equal to zero, indicating that those records are not affected by the defect on that track. Of course, if there is no defect on the track then the skip displacement SD in all fields of all records written onto that track will have a value of zero.

During a read operation the skip displacement SD of each record is stored to control the inhibiting of the read means such that the special gap SG is not recognized as useful data.

During the normal operation of storage systems of the type contemplated for use with this invention, all write operations are preceded by some type of a read operation for the purpose of identifying where the storage media is with respect to the read/write transducers. The description will be directed toward disk drive systems for the purpose of example. Since the magnetic disk is rotating, it is mandatory to locate the record with which one desires to write information into. It is the general procedure of these type of systems to do a search operation, which is a read operation, to locate the desired record to be written or to be read. Using this knowledge, the search read operation is modified to generate the next value for the skip displacement SD of the following record each time a record is read. It can readily be realized that this is done because the skip displacement SD is known from the control field of the record being read and the data length RL is known to the system as is the fixed length of the control field CL for the record being read.

This is done even where the record being read is the one that is affected by the defect. During that operation it is important to set the value of the skip displacement SD to zero to indicate to the control circuitry that that record is not affected by the defect.

When the record preceding the record to be written is identified, there has been generated a value of the skip displacement SD to be inserted into the control field of the record to be written during the following write operation. Also, the control circuitry by knowing the data field length DL of the new record to be written can take such action as to write the special gap at the proper location. If the defect does not affect the record to be written, then during that write operation the value of the skip displacement SD for the next subsequent record is generated during that write operation such that if the write operation is followed by another write operation, the correct value of the skip displacement SD for that subsequent record will have been generated so that proper formatting will continue.

To generalize the procedure, it can be said that during the write operation the skip displacement SD from the preceding record is used to generate the value of the skip displacement SD for the record being written and during a read operation, the skip displacement within the record itself is used to control the reading of that record and for locating the special gap within that record, if that record is affected by the defect.

Figure 3:
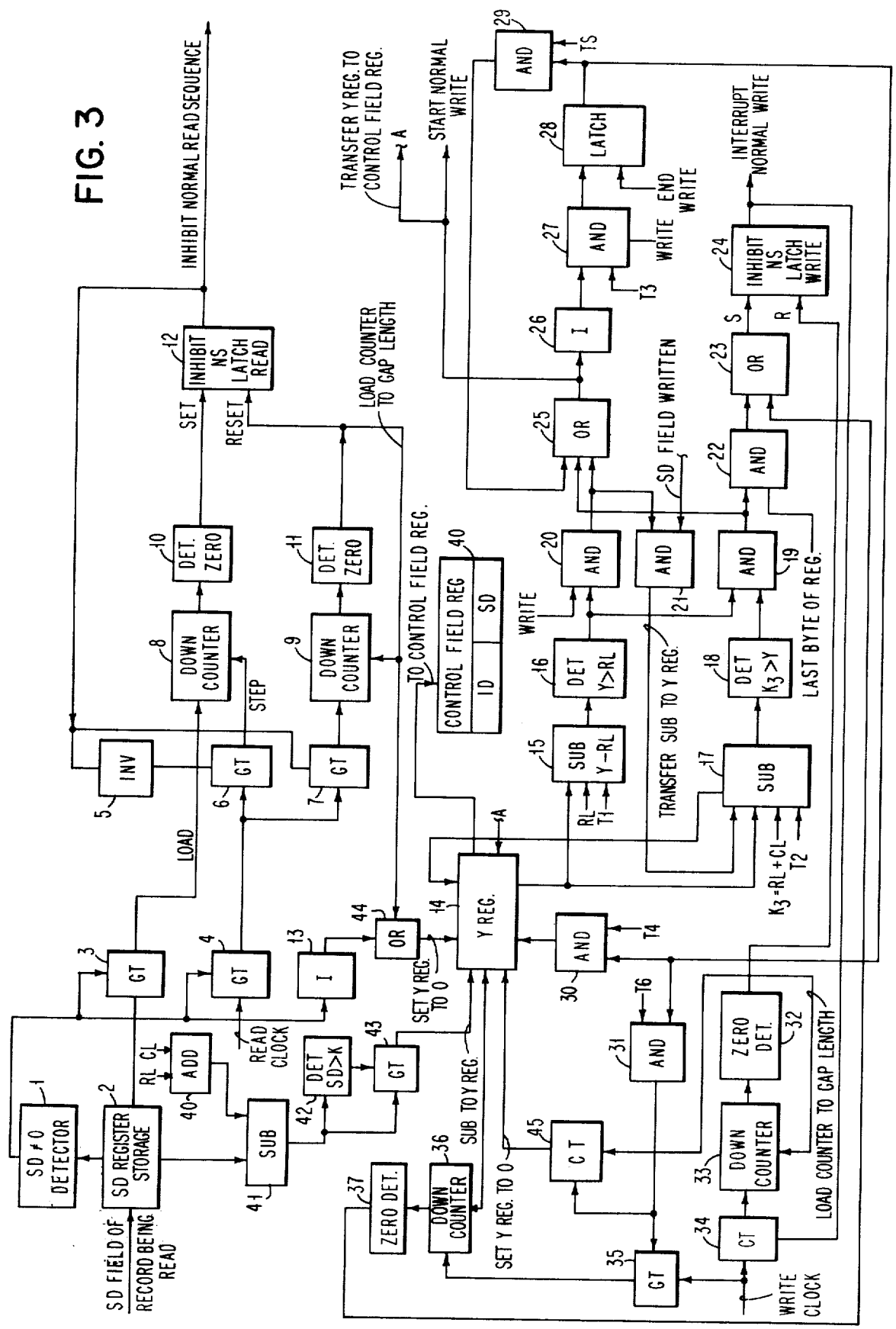
FIG. 3 shows the first embodiment of the control logic for generating the necessary interruption signals for the normal read/write sequence of a storage system for placing the special gap over the defect during a write operation and for reading the special gap at the proper time during a read operation.

Attention is now directed toward FIG. 3 which is the apparatus for generating the necessary control signals to the normal control unit for altering the normal sequence of the controlling apparatus for the insertion of the power value of the skip displacement SD field into the control field, the placement of the special gap SG into the record at its proper location if that record is affected by the defect, for generating the value of the skip displacement SD for the subsequent records to the written and for controlling the normal read sequence such that it may be interrupted when a special gap SG is approaching the transducer such that the information read from the special gap SG will not be interpreted as data by the controlling system.

It should be realized that the writing and reading of data from magnetic media is well known in the art and the sequencing of operations to perform those operations are varied and many. It is the object of this invention to provide control apparatus and a method for interrupting that normal sequence at the proper time and for generating that special gap such that the special gap will be located about the defect on recording media and then for avoiding the special gap during a read operation.

The method and apparatus will be described together as a sequence of operations occurring in which a read operation precedes a write operation. With reference to FIG. 3, the SD field of the control field of the record being read is stored into the SD register 2. SD register 2 is interrogated by detector 1 to determine if the value of SD is not equal to 0. If the value of SD is equal to 0, gates 4 and 3 are closed and the reading of that record follows its normal operation. If the output of detector 1 is in the affirmative, then the record being read may be affected by the defect and gates 3 and 4 are open. The value of the SD field in SD register 2 is loaded into down-counter 8. Read clock pulses are decremented in down-counter 8 as each byte of data is read. For the sake of discussion in this example, it will be assumed that the information is recorded in byte format on the recording media. The read clock will step down-counter 8 as long as inhibit latch 12 remains in a reset condition. Inverter 5 controls gate 6 which in turn controls the read clock pulses from reaching down-counter 8. Detector 10 determines when down-counter 8 equals 0. If this condition is sensed then the record being read is affected by the defect and a special gap is now at the transducing elements. Inhibit normal sequence read latch 12 is set which generates a signal to inhibit the normal read sequence. The setting of latch 12 will also cause gate 6 to be deactivated which will cause down-counter 8 to stop. Gate 7 now allows the read clock pulses to count down down-counter 9. Down-counter 9 has been previously set to the special gap length. Detector 11 monitors down-counter 9 and indicates when down-counter 9 equals 0. When down-counter 9 equals 0, then the special gap has passed under the transducing element. The inhibit normal sequence latch 12 is reset allowing the normal read sequence to continue. The output from detector 11 is also fed back to the downcounter 9 to again set down-counter 9 to the length of the special gap in preparation for the next time it will have to be used. The resetting of the latch 12 causes gate 7 to be closed such that the read clock pulses now do not affect down-counter 9.

When the detector 1 has detected that the value of storage register 2 is equal to 0, then the Y register 14 is set to 0 via inverter 13 and OR circuit 44. Whenever detector 11 reaches a 0 value, the resulting output signal will also pass through OR 44 and set the Y register 14 to 0. Since all following records must not be affected by the defect, the value of the Y register or the value of the SD field of the next count field should be equal to 0.

Finally, the read circuitry will generate a non-zero value for the SD field for the next record if detector 42 senses that the length of the record being read is less than the skip displacement SD stored in register 2, thus indicating that the defect does not affect this record but will affect some subsequent record. The value of the SD field for the next control field is generated by subtraction circuitry 41 and addition circuitry 40 which subtracts from the SD value the value of the present data length RL and control length CL. The result of the subtraction is the new value of the SD field for the next record which is gated by gate 43 to the Y register 14.

It can therefore be appreciated that the control circuitry will provide the proper inhibit read signal, the proper timing for recognizing the special gap and perform the necessary decision processes to determine the proper value of the Y register 14 by the end of any given read operation.

During the write operation, the contents of the Y register 14 is subtracted from the data field length $R_L$ by subtractor 15 at time T1. Detector 16 determines whether the contents of the Y register 14 were greater than the data length DL and if such is the case, conditions one leg of AND 20. If a write operation is being performed, AND 20 is fully conditioned, which causes an output of OR 25 to be generated which indicates a start of the normal write sequence and that the contents of the Y register 14 should be transferred into control field register 40 for writing the Y register 14 contents into the SD field. The output of detector 16 indicates that the record to be written is not affected by the defect. The output of AND 20 is also an input to AND 21 which upon the indication that the SD field has been written for this record, causes the transfer of the resultant of subtractor 17 to be transferred to the Y register as the new skip displacement SD for the next record to be written.

Subtractor 17 has as its input the value of the Y register 14 and the record length K3, the data length RL plus the control field length CL. The additional of these two elements is not shown but techniques and circuitry are well known in the art to add two numbers. At a time T2, the subtraction is performed which is before the signal that the SD field has been written. The output of subtractor 17 is detected by detector 18 to determine whether the record length is greater than the skip displacement SD in the Y register 14. AND circuit 19 determines whether or not the defect will occur within the next control field by ANDing the conditions of detectors 16 and 18. The output of AND 19 will therefore pass through OR 25 to cause the start of a normal write sequence and the writing of the contents of the Y register 14 into the SD field. The transfer of the subtract of the value in subtractor 17 is not transfered to the Y register 14 until after the present value of the Y register has been written as the SD field for this record. When the last byte of the record presently being written is detected, AND 22 becomes conditioned. When AND 22 becomes conditioned, the inhibit normal sequence write latch 24 is set. The setting of the write latch 24 interrupts the normal write sequence and conditions gate 34. Down-counter 33 having been previously set to the special gap length will be counted down by write clock pulses passing through gate 34. When the down-counter 33 is equal to 0, detector 32 will detect this condition and will reset the write latch 24, deactivate gate 34, the down-counter 33 is reset to the special gap length and the Y register 14 is set to 0 such that on subsequent write operations the SD field will indicate for subsequent records that the defect will not affect that record. The control circuitry causes a special gap to be written immediately following the end of the data field of the record being written such that the next record will be moved down the track from its otherwise normal position by a length equal to the special gap.

If OR circuit 25 is not conditioned by either AND 19 or AND 20, then latch 28 will be set by means of inverter 26 and AND 27 during a write operation at time T3. The timing of T3 is such to allow the decision-making process with regard to detector 16 and 18. Latch 28 being set indicates that the record to be written will be affected and that the defect will be bypassed by bifurcating the data field into two parts. The output of latch 28 passes through AND 29 at T5 time to cause a start normal write operation and the writing of the contents of the Y register 14 into the SD field. The output of latch 28 also will cause the contents of the Y register 14 to be transferred to down-counter 36 by means of AND 30 at time T4. Note that this transfer is done before the start of the normal write sequence. At T5 time the gate 35 is conditioned which allows write clock pulses to step down down-counter 36. When down-counter 36 is equal to a 0, detector 37 produces an output which indicates that the special gap should start to be written. The output of the zero detector 37 therefore passes through OR 23 and sets the inhibit normal write latch 24 which interrupts the normal write sequence. Also, the conditioning of AND 31 at T6 time will cause the Y register 14 to be set to 0 such that the Y register 14 is now at the proper SD value for the subsequent records to be written on the track.

The output on detector 37 indicated that the first part of the data field has been written and that it is now time to write the special gap. The setting of inhibit normal sequence write latch 24 initiates a circuitry for the writing of the special gap through gate 34, down-counter 33 and zero detector 32 in a similar manner as previously described. The output of detector 32 indicates that the special gap has been written and resets the inhibit normal sequence write latch 24 allowing the normal write sequence to continue. At the end of the write operation, latch 28 is reset and the system is ready to continue with the next instruction.

As can be discerned from the previous discussion, the method and apparatus for controlling the write circuitry and for inserting the special gap at the correct position according to the criteria set forth has been described in detail. Of course, various changes to the logic can be made to add more functions for taking into account a different set of criteria as based on the designer's choice during the design phase.

However, the foregoing discussion of the control circuitry for interrupting the normal read/write sequencing of a control unit clearly demonstrates how the invention may be operated to perform the desired functions.

Second Embodiment

One of the most commonly used data formats presently in use in the disk storage technology is the format of count-key-data. The formatting of count-key-data requires that gaps be written in-between the count and key fields, the key and data fields and finally the data and count fields.

Referring to FIG. 5 there is seen in linear fashion a typical layout of the data track on a storage device from index point to index point. It will be appreciated that for the situation in which the peripheral storage device is a cyclic device such as a rotating storage drive, the index point at either end of FIG. 5 is one and the same and that the track is in fact circumferential. Home address (HA) contains the address of the track while record zero (R0) is a track descriptor record. Record 1 through record N are rcords in which is usually stored useful information.

FIG. 6 shows an exploded view of the count-key-data format. A gap G2 is shown to be placed between the count and key field, a gap of type G3 is shown to be placed between a key field and data and a gap G4 is shown to be placed between a data and count field. Gaps G2, G3 and G4 also may contain other information such as sync information and an address mark. In its normal usage, the count-key-data format only calls for an address mark to precede a count field. It should further be noted that the use of the word gap does not indicate that nothing exists between the count and key fields but rather in normal usage there is written continuously information bytes throughout the gaps so as to maintain proper synchronization. Therefore, it would be wrong to assume that a gap means a void whereas in this situation a gap actually is written in a defined format. Recording in this manner is well known to those of ordinary skill in the art and for precise details the reader is referred to U.S. Pat. No. 3,299,410 by J. R. Evans and assigned in common herewith and also the IBM publication entitled, "2841 Storage Control (Stage 2)",Field Engineering, Theory of Operation, Form Y26-4000-2, pages 1-8 — 1-15, published in 1966. It should be understood that this embodiment teaches how to generate the necessary controlled signals for the modification of the normal write or read operation as practiced by the apparatus as taught in the Evans' patent and the 2841 Storage Control and does not contemplate that this present control apparatus for the read/write operation is part of the present invention.

FIG. 7 shows how the special gap would be written within the count-key-data format with the end portion of the special gap used as a sync area. If the end of the special gap is to have the sync area, then the defect should be centered in the middle of the non-sync area of the special gap such that the defect does not affect the sync information. The manner in which the special gap is written once it is commanded to be written in this environment is straight forward and follows the same teaching as how gaps G2, G3 and G4 are written in the present technology. Therefore, the apparatus for generating the special gap is not discussed herein but rather how to generate the signals for initiating that the special gap is to be written is described.

FIG. 8 is a blown-up view of the new count field that would be used with the count-key-data format. Two bytes are used for defining the skip displacement field SD. One byte of flags F are used. The rest of the field will be used to provide addressing information and also to define the field length of the key fields KL and data fields DC.

FIG. 9 shows a blown-up view of the flag byte and indicates that the first three bits will indicate which of the fields within a key-data-count sequence of count-key format would be affected by the defect. It should here be noted that since the count field is classically of a fixed length and short in duration, that for the sake of the discussion of the second embodiment, that the count field will always be moved rather than bifurcating the count field. Further, for use in the second embodiment, the skip displacement for the SD field will be measured from the end of the count field of a record to the center of the defect as shown in FIG. 4. The format operation of key-count-data also will specify the length of all gaps G1, G2, G3, G4 and G0. Therefore in any given system, the length of the count field and the gaps are constants which can be used in the determination of the position of the defect and its result on a record being written or read.

Figure 10:
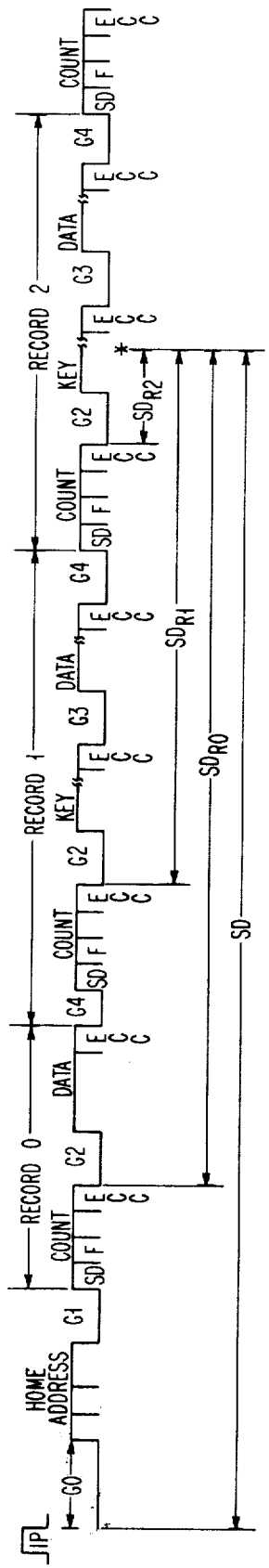
FIG. 10 shows a data track as normally used in the art with the count-key-data format for sequential records recorded on a single data track.

FIG. 10 shows in linear view measurement of the skip distance from the index mark and from the end of the count field of subsequent records to a defect in record R2. It should be noted that the count field of records 0, 1 and 2 shows the presence of the SD field and the flag field as well as an ECC (error correction code) field. The data and key fields also have ECC fields. The ECC field is of a knowing length and this represents another constant to be taken into account in determining the location of the defect and the effect, on the defect on any given part of the record. FIG. 10 also indicates as in the previous embodiment that the SD field of each record will be decreasing in value until the defect is encountered. Records thereafter will be not affected and this will be indicated by the SD field being zero and the flag field having bits 0, 1 and 2 equal to zero. The flag byte is necessary so that the combination of the information represented by bits 0, 1 and 2 in conjunction with the SD field may be used to determine where the defect is and what action should be taken by the read/write control circuitry to make the defect transparent to the using system.

FIG. 10 shows in record 2 a defect being located in the key field. FIG. 10, however, does not show what action will be taken to avoid the defect in the key field. The action that may be taken will be described with regard to the detailed description of the second embodiment.

As in the first embodiment, the general rule will be followed that during a write operation the skip displacement that was generated by the previous read or write operation will be used to determine the present value of the skip displacement for the record to be written and further, that during the read operation the skip displacement in the count field of that record will be used to determine if that record is affected by the defect and what evasive action has been performed such that the special gap may be read at a proper time to make the defect transparent to the using system.

The second embodiment incorporates the following ground rules:

1. If the defect is within a distance from the end of the count field defined by the length of the G2 gap plus one-half the length of the special gap SG then move the G2 gap and insert the special gap immediately following the ECC of count field;

2. If the defect lies within the key area beyond the limits set by the first criteria, then bifurcate the key area to avoid the defect;

3. If the defect should lie within a distance from the end of the count field as determined by the summation of the length of the G2 gap, the key length, the key ECC length, the gap G3 length and one-half the special gap length, then move the G3 gap if the criteria of 1 and 2 have not been met by inserting a special gap SG immediately following the ECC of the key field.

4. If the defect lies at a point as measured from the end of the count field less than the summation of the lengths of the G2 gap, the G3 gap, the key length, the ECC length for the key length, the data length and the ECC length for the data length, and none of the first three criterias have been met, then bifurcate the data field to avoid the defect if none of the first three criterias have been met; and 5. If none of the first four criterias have been met and the record is affected, then move the G4 gap by inserting a special gap SG immediately following the ECC of the data field.

The normal length of the special gap is such that it is generally longer than any of the gaps used in the count-key-data normal formatting. Under such a condition, it is possible for the defect to lie in either the key or data field and still be within one-half of the length of the special gap and therefore, can be avoided by moving the record downtrack which is easier than bifurcating the field. The foregoing ground rules were described to make the most efficient use of the recording surface of the magnetic medium. The ground rules selected are not critical and may be altered by a designer according to his own design criteria and data formatting. The second embodiment will, however, be described to perform the ground rules as set forth above.

Figure 11:
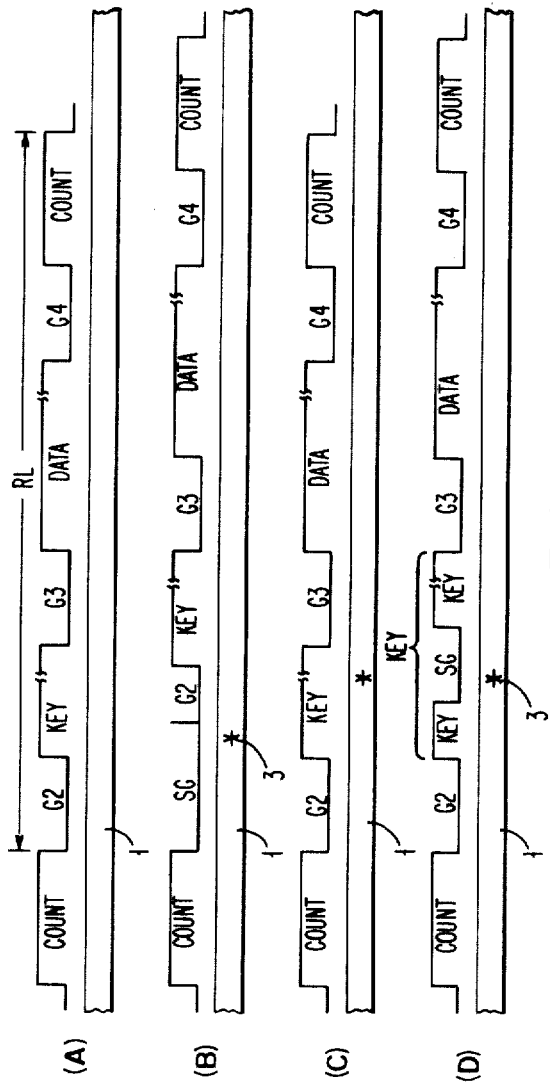
FIGS. 11A and 11B illustrate the movement of a key field to avoid a defect in accordance with my invention.
FIGS. 11C and 11D show the division of the key field into two separate pieces in order to avoid a defect in accordance with the method and apparatus of my invention.

FIGS. 11A and B demonstrate the condition where the defect lies within the key field and is of such a value that the G2 gap can be effectively moved for the purpose of avoiding the defect. This basically illustrates criteria (1) as stated above. FIGS. 11C and D demonstrate a defect in the key area where the key area is bifurcated in accordance with the ground rule (2) stated above for the purpose of avoidance of the defect.

Figure 13:
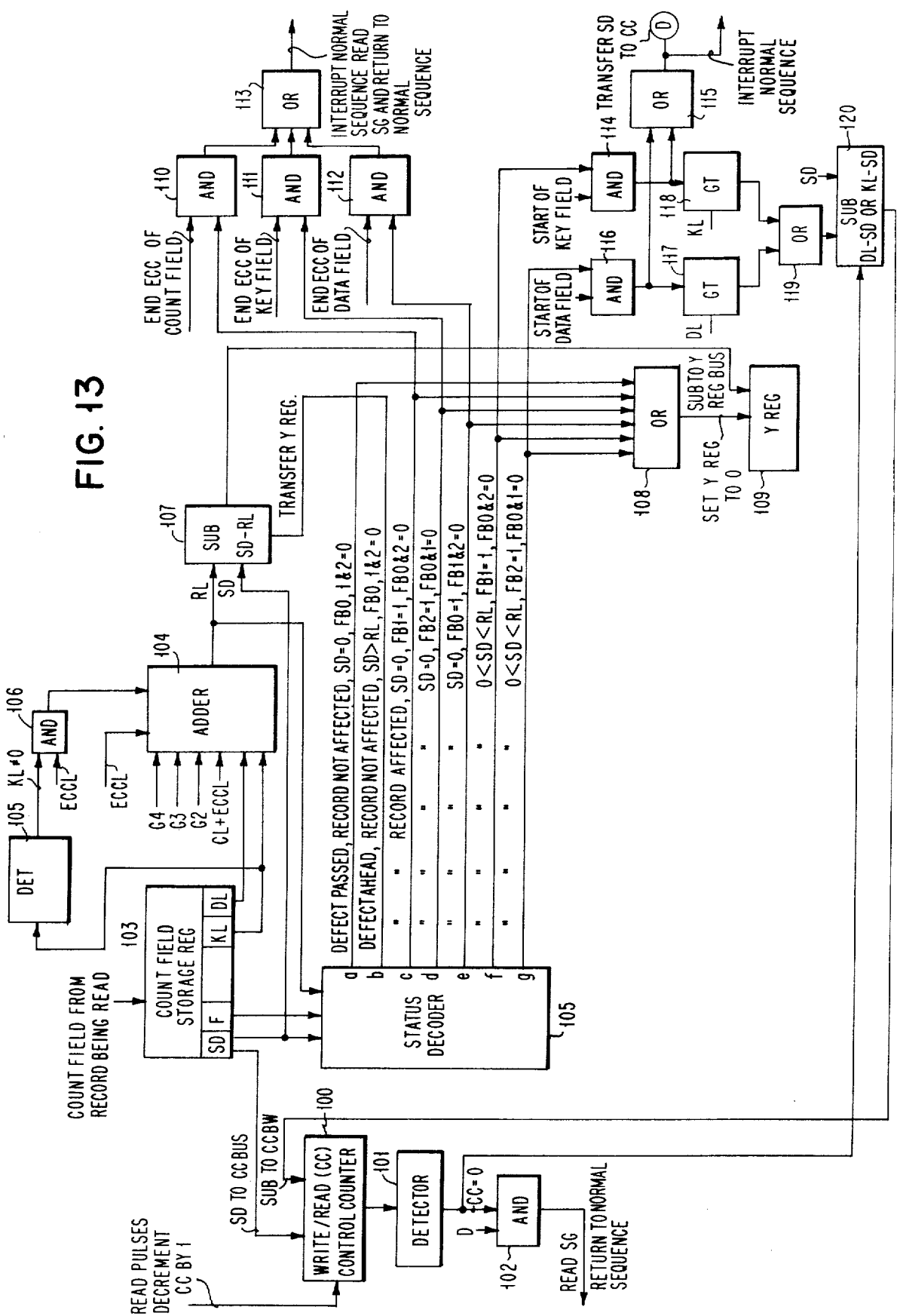
FIG. 13 is a detailed logic drawing showing the generation of the necessary interrupt signals for use with the controlling unit of the read/write circuitry of a storage system during a read operation of a storage system using the count-key-data format.

FIG. 13 shows the control circuitry which embodies a method for generating the necessary inhibit command to the read sequence control circuitry for controlling the reading of a record having the defect within it and for further generating the value for the SD field of the next record and storing that properly in the Y register 109. Again, as was performed with regard to the first embodiment, the operation of first a read then a write sequence will be discussed.

As a record is read, the count field from that record is stored in the count field storage register 103. The SD and flags fields within the count field are inputted into the status decoder 105. The status decoder decodes the value of the SD and flag fields by means of a series of AND and OR circuits and digital comparators. The status decoder is a straight forward logic combination and it is not felt necessary to describe that circuitry in detail. It is sufficient for one to indicate that the inputs to the status decoder are the binary value of the SD field, the binary value of the first three bits of the flag field and the binary value of the record length. Only one output of the status decoder will be available at any one time. The output $a$ of the decoder indicates that the defect has been passed and that the record presently being read is not affected. This is as a result of the SD field being equal to 0 and all of the flag bits 0, 1 and 2 also being equal to zero. The output *b* of status decoder 105 indicates that the defect is ahead but that this record is not affected. This was ascertained by determining that the SD field value is greater than the record length RL and the flag bits 0, 1 and 2 being equal to zero. Status decoder 105 output *c* indicates that the defect is ahead and that the record in question is affected. Further, the G2 field has been moved such that the special gap immediately follows the count field. This was indicated by the SD field having a value equal to zero, the flag bit 1 being equal to 1 and the flag bits 0 and 2 equal to zero.

The output *d* of status decoder 105 is activated when the defect is ahead and the record being read is effective such that the G3 gap has been moved and the special gap has been written immediately following the key area. This condition is indicated by the SD field having a value of zero, the flag bit 2 being equal to 1 and flag bits 0 and 1 being equal to zero. Output *e* of status decoder 105 is affected when the defect is ahead and the record being read is affected such that the G4 gap has been moved and the special gap has been written immediately following the data field. This condition is indicated by the value of the SD field to be equal to zero, the flag byte zero being equal to a 1 and flag bytes 1 and 2 being equal to zero.

Output *f* of the status decoder 105 is activated when the defect is ahead and the record is affected such that the key field will be bifurcated. This is indicated by having the SD field being greater than zero but being less than the record length RL, flag bit 1 being equal to a 1 and flag bits 0 and 2 being equal to 0. The value of the SD field will indicate the distance from the start of the key field to the start of the special gap within the key field. Finally, the output of staut decoder 105 will be activated when the defect is ahead and the record is affected where the data field will be bifurcated. This will occur when the SD field has a value greater than 0 but less than the record length RL, flag bit 2 is equal to a 1 and flag bits 0 and 1 are equal to 0. The value of the SD field in this case will be the distance from the beginning of the data field to the start of the special gap within the data field.

The setting of the SD and F field will be explained in detail in the following discussion of the write logic for generating the commands for the write count-key-data format. All output of the status decoder except the output *b* are fed to OR 108. OR 108 sets the Y register 109 to a value of 0. Only output 0 will be raised when the defect will affect some subsequent record. Setting Y register 109 to zero is the only function performed by output *a* of the status decoder 105, which simply allows the normal read sequence to follow its normal course of action. Output *b* of status decoder 105 being activated will cause the results of the substraction performed by subtractor 102 to be transferred to the Y register 109. Adder 104 generates the record length of the record being read from the summation of the constants for the count length, the ECC length for the count length, the gap 2 length, the gap 3 length, the gap 4 length, the data length, the ECC length for the data length and the ECC length for the key length, if in fact a key length is present. The presence or non-presence of the key length is determined by detector 121 and controls the addition of the ECC length for the key to be added into adder 104. The key field having a value of zero will be a non-entity during the addition and does not affect the resulting summation. Therefore, output *b* of status decoder 105 will cause the new value of the SD field for the next record to be generated and stored in the Y register 109 and allow this record to be read under normal sequence.

When the status decoder 105 output *c* is activated, one input to AND 110 is also activated. At the end of the ECC byte of the count field, AND 110 is activated which causes OR 113 to be activated generating an interrupt normal sequence signal and indicating that the next section to be read will be the special gap. Upon the termination of the special gap, the system is returned to normal sequence and processed in a normal manner. The circuitry by which the passing of the special gap may be determined and can be identical to that which was shown in accordance with the first embodiment and is not felt necessary to reshow that circuitry within this embodiment.

When output *d* of status decoder 105 is activated, one input to AND 111 is activated. At the end of the ECC of the key field, the other input of AND 111 is activated causing OR 113 to be activated which interrupts the normal sequence and indicates that the next area to be read will be a special gap. Upon the reading of the special gap, the sequence is returned to the normal sequence.

When output *e* of status decoder 105 is activated, one input to AND 112 is activated. When the end of the ECC of the data field is indicated, AND 112 activates OR 113, interrupting the normal sequence of the read operation indicting that the next area to be read will be that of a special gap. Upon finishing reading the special gap, the sequence is returned to its normal read sequence.

When output *f* of output decoder 105 is activated, an input to AND 114 is activated. When the key field is begun to be written, the key length is gated into subtractor 120 via gate 118 and OR 119 and subtracted from the skip displacement SD, which is in the count field storage register 103. The output of AND 114 also passes through OR 115 which interrupts the normal read sequence and transfers the SD field into the write/read control counter 100. Read pulses are inputted to control counter 100 to decrement the counter to zero. Detector 101 detects the zero condition and generates an output when that condition is reached. It should be remembered here that under this condition, the key field is to be written in two parts and that the value of the SD field stored in the storage register 103 is equal to the skip displacement from the beginning of the key field to the start of the special gap. The output of detector 101 indicates that this condition has been reached and AND 102 conditioned by the OR 115 indicates that we are in this special mode. The normal sequence will be interrupted, the special gap read and then the sequence will be returned to the normal sequence. Detector 101 output also causes the difference between the key length KL and SD length to be transferred into the control counter 100. This difference represents the remaining part of the key field to be read after the special gap has been read. Therefore, the circuitry has set up the necessary conditions to continue in the normal sequence once the special gap has been read.

In similar manner, when output *g* of status decoder 105 is activated AND 116 is activated when the start of the data field is indicated. AND 116 being activated will gate the data length DL from the storage register 103 to subtractor 120 for generating the difference between the data length DL and the present skip displacement SD stored within storage register 103. The output of AND 116 will also cause the value of the SD field to be inputted into the read/write control counter 100 instead of the normal data length as is the normal sequence. The interrupt normal read sequence is interrupted interrupting the normal read operation.

Here again, it should be remembered that the value of the SD field is the distance from the beginning of the data field to the beginning of the special gap within the data field which divides the data field into two parts. The read operation continues such that the first part of the data field is read until detector 101 indicates that the special gap is at the transducing elements of the system. Under this condition, AND 102 will be activated which will indicate that the special gap is to be read and then the system is to return to the normal sequence of operation for a read operation. The output of detector 101 also causes the remainder found in subtractor 120 to be transferred to the control counter 100 such that the remaining portion of the data field may be read by the normal sequence when the reading of the special gap has been completed.

From the foregoing discussion, it can be seen that the logic as shown in FIG. 13 will interrupt the normal count-key-data sequence to provide the necessary signals for the avoidance of defects according to the ground rules previously set. The control logic has therefore made the defect transparent to the using system since it only interrupted the read operation for the period of time that the special gap had passed beneath the reading transducers and the system had indication during that special gap time that the information was in fact a special gap and not the data and therefore could be ignored.

Figure 14A:
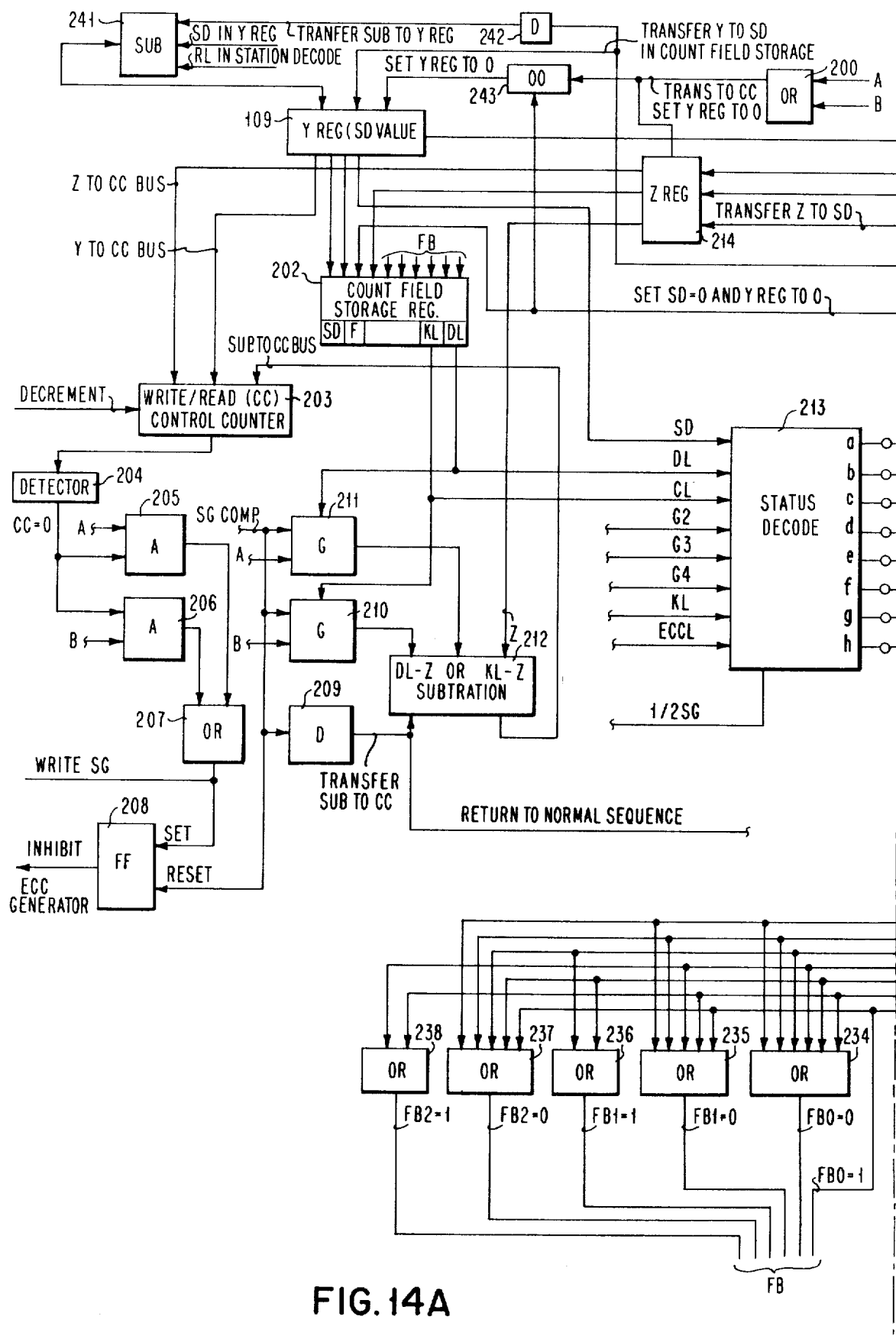
FIGS. 14A and 14B show the detailed logic necessary to determine the proper value for the skip displacement field and the flag field and for causing the special gap to be written in the proper location during a write operation of a system using the count-key-data format.
Figure 14B:
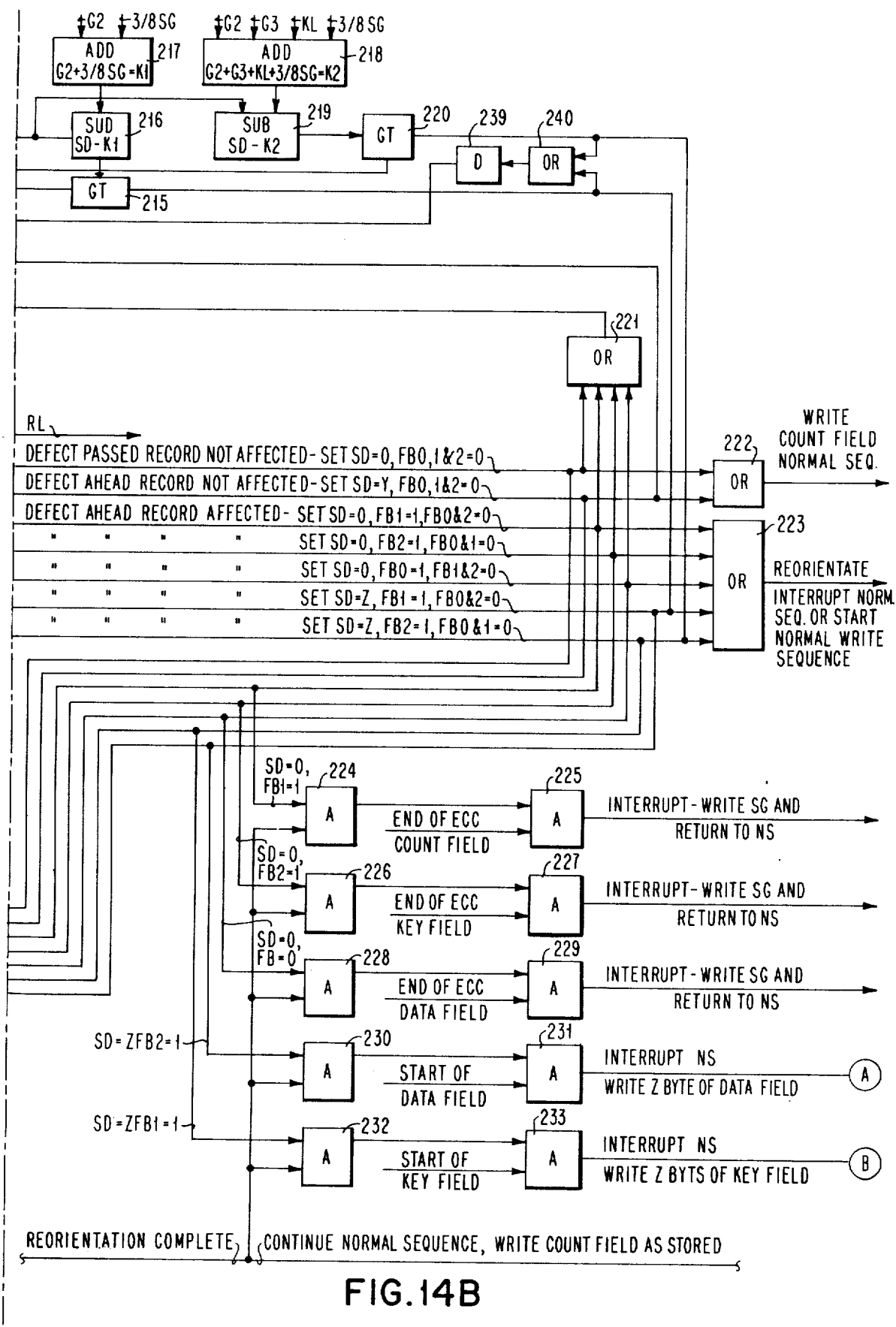

FIGS. 14A and 14B show the control circuitry for practicing this invention for causing the interruption of the normal write count-key-data sequence and for generating the special gap at the proper position as defined by the ground rules set forth above. Y register 109 contains the predicted SD value for the record to be written which was generated by the preceding write or read operation. The count field to be read is inputted into the control unit for controlling the normal read/write operation and stored into the control field storage register 202. The apparatus first generates a count field in the storage register 202 that is correct for the record to be written. The key length KL and data length KL from the storage register 202 is inputted into status decoder 213, as is the predicted skip displacement value SD from the Y register 109 and all needed constants. Status decoder 213 has eight output lines $a-h$.

Figure 15:
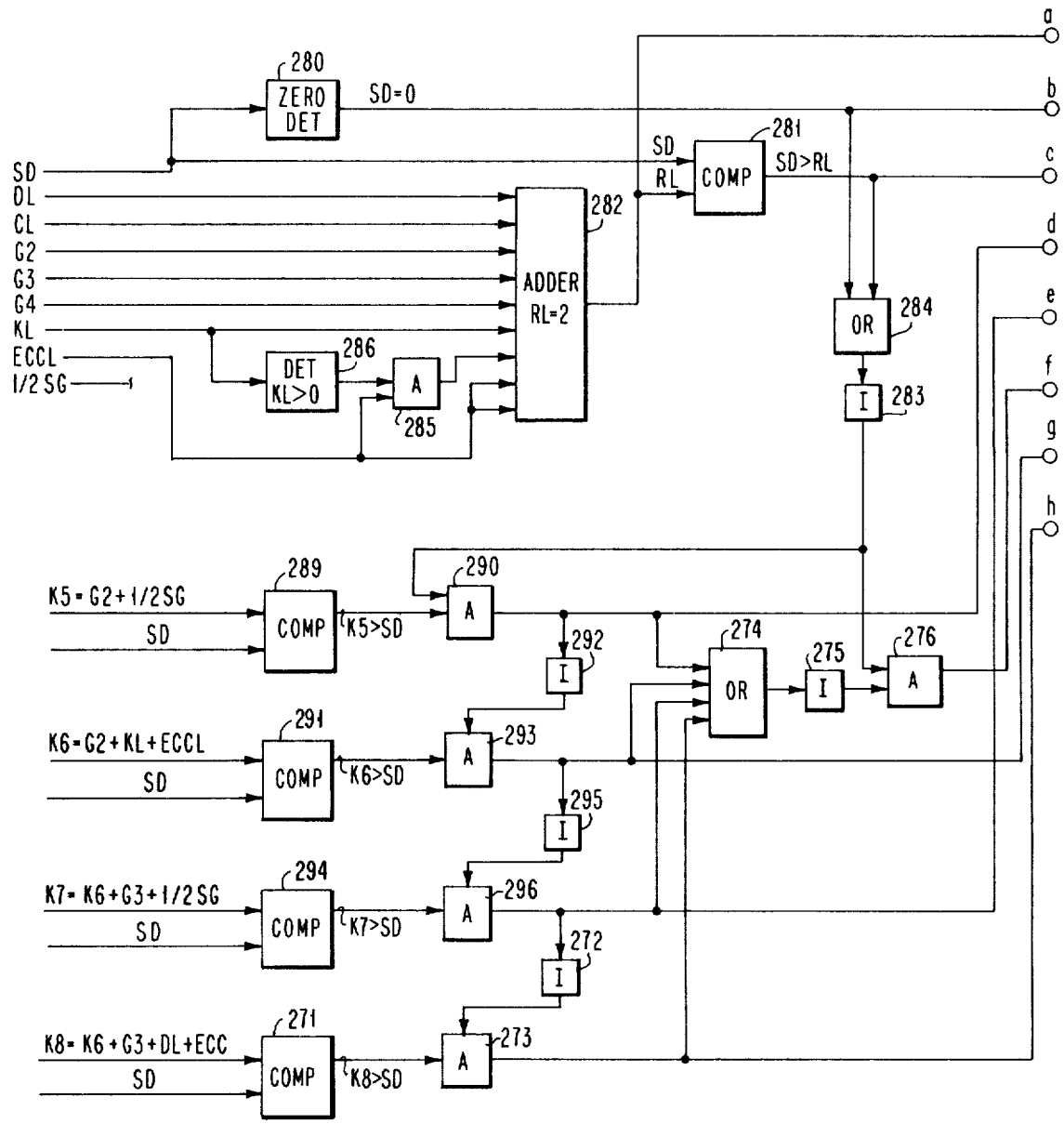
FIG. 15 shows a detailed logic drawing of the status decoder of FIG. 14.

Referring now to FIG. 15, logic for status decoder 213 is shown. Status decoder 213 has as its inputs all the necessary constants that are used within the system for the purpose of making the decisions for generating the proper output lines $a-h$. Adder 282 generates the record length which is equal to the summation of the count field length $C_L$, the key field length $K_L$, the data field $D_L$, gap length G2, G3, G4, and the ECC lengths for the count, key and data fields (which are all the same in this example). Detector 286 determines whether the key field is greater than zero and if the key field is greater than zero, allows the ECC length constant to be added three times rather than two times.

Detector 280 determines whether the SD field is equal to zero and if it is equal to zero, activates output line $b$ of status decoder 213. When output $b$ of status decoder 213 is activated, it signifies that the defect has been passed and that the record is not affected.

Comparator 281 compares the skip displacement SD with the record length RL generated by adder 282. If the skip displacement SD is greater than the record length, then output $c$ is activated which indicates that the defect is ahead, this record is not affected by that defect and that the count field of the next record will not be affected by that defect.

Output $a$ has available on it the binary value for $R_L$. If output $b$ or $c$ is not activated, then OR 284 will be down which will be inverted by inverter 283 to allow one leg of AND 290 to be activated. Comparator 289 has as its input the skip displacement SD and as its second input the summation of the G2 plus one half of the special gap length ½ SG. The positive output would appear from the comparator if that summation K5 was greater than the skip displacement indicating that the defect is within that range. Therefore, AND circuit 290 will be activated which will activate output $d$ of status decoder 213 indicating that the defect is ahead, the record is affected and that the G2 gap should be moved such that the special gap is written at the end of ECC bytes of the count field.

The output of AND 290 is inverted by inverter 292 to condition one leg of AND circuit 293. The other leg of AND 293 is conditioned when the skip displacement SD is less than the summation of the length of the G2 gap, the key field length, and the ECC length. The output of AND 293 is output $g$ of status decoder 213 which indicates that the defect is ahead, that the record is affected and that the key field is to be divided into two parts with a special gap written in-between those two parts of the key field.

The output of AND 293 is inverted by inverter 295, conditioned by one leg of AND 296. The other leg of AND 296 is the output of comparator 294 which indicates that the defect lies within a distance of gap G3 length plus one-half the special gap length from the end of the ECC field associated with the key field. AND 296 being activated indicates that the G3 gap is to be moved and that the special gap is to be written immediately following the ECC field associated with the key field.

The output of AND circuit 296 is inverted by an inverter 272 for activating one input to AND circuit 273. The other leg of AND circuit 273 is activated when the skip displacement is less than the summation of the lengths of the G2 and G3 gaps, the key length and the data length plus the ECC length associated with the key length and the ECC length associated with the data length. If AND 273 is activated, output line $h$ of status decoder 213 is activated. Output $h$ of status decoder 213 indicates that the defect is ahead, that this record is affected and that the data field would have to be divided into two portions and that the special gap will be written in-between the two portions of the data field.

Only one additional logical decision need be made, that being to increase the length of G4 by SG to displace the next count field to avoid the defect. This is accomplished at AND 276, whose two inputs indicate that SD RL from inverter 283, and that none of the other conditions from the four comparators 289, 290, 291, or 271, exist. These four outputs are or'd at OR 274, inverted at 275, and fed to AND 276 as the second input. The output of AND 276 provides output $f$ of Status Decoder 213.

FIG. 15 shows the decision logic necessary to determine the raising of lines $b$—$h$ for determining what action is to be taken by the logic on FIG. 14.

Returning to FIGS. 14A and 14B, when output $b$ of status decoder 213 is raised, the SD field of the storage register 202 is set to a zero by means of OP 221 and the flag bits 0, 1 and 2 are set to a zero by means of decoder logic comprised of ORs 234–283. Output $b$ also allows the count field to be written during its normal write sequence.

Output $c$ when raised will cause the contents of the Y register 109 to be stored into the SD field in storage register 202. Output $c$ is delayed by delay 242 which transfers the result of the subtraction of the record length found on output $a$ of status decoder 213 from the value of the skip displacement SD as set in the Y register. The transfer of this difference is transferred from subtractor 241 to the Y register 109. The delay insures that the initial contents of the Y register 109 have been transferred to the storage register 202. Output $c$ also causes flag bits 0, 1 and 2 to all be set to zero by means of the flag bit decoder setting logic or circuits 234–238. Finally, output $c$ activates the write count field normal sequence via OR circuit 222. Under these conditions, it can be realized that the count field will be written with the initial value of the Y register 109 in the SD field, all flag bytes 0, 1 and 2 equal to 0 and the final value Y register 109 will now contain the skip displacement SD for the next record to be written.

Output $d$ of status register 213 will again cause a zero to be set into the SD field via OR 221 and flag bit 1 to a 1 and flag bit 0 and 2 to a zero by means of ORs 234–238.

Output $e$ of status decoder 213 will again cause the SD field to be set to a zero by means of OR 221 and flag bit 2 to be equal to a 1, and flag bits 0 and 1 to be equal to a zero by means of OR 234–238.

Output $f$ when activated will again cause the SD field of the storage register 202 to be set to a zero via OR 221 and will cause flag bit zero to be set to a one and flag bits 1 and 2 to be set to a zero via ORs 234–238.

Output $g$ of status decoder 213 when activated will set the SD bits of the storage register 202 to the value of the Z register 214 and flag bit 1 to equal a 1 and flag bits 0 and 2 to equal 0 via ORs 234–238. It should be remembered that the skip displacement under this set of conditions will be the distance from the start of the key length to the start of the special gap. In order to generate this value, adder 217 adds together the value of the length of the G2 gap to a value that is equal to ⅜ of the special gap length. The value with regard to the special gap is ⅜ rather than ½ because in this format according to FIG. 7, i.e. the end portion of the special gap contains sync information. In order to protect the sync information, the defect is centered in the remaining portion of the special gap. Therefore, the distance from the center of the defect to the start of the special gap is less than ½ the special gap and for this application, for this example, it is assumed that the distance is actually ⅜ the special gap. The resulting summation is subtracted from the skip displacement as set forth in the Y register 109 by subtractor 216. The results are a value equal to that portion of the key length that is to be recorded from the start of the key length to the start of the special gap. This value is placed in the Z register 214 via gate 215 which is activated by output $g$ of status decoder 213. Output G of status decoder 213 is also fed to delay 239 via OR circuit 240 and transfers the contents of the Z register to the SD field of the storage register 202. The delay is such as to insure that the summation is complete and transferred to the Z register via gate 215 before the transfer to the SD field in storage register 202 takes place.

When output $h$ of status decoder 213 is activated the SD field of storage register 202 is again set to the value of the Z register 214, and flag bit Z is set to a 1 while flag bits 0 and 1 are set to a 0 via ORs 234–238. As before, adder 218 cooperates with subtractor 219 to generate that portion of the data field that is to be written before the special gap is written. Gate 220 conditioned by output $h$ of status decoder 213 allows the resultant of the subtraction to be transferred to the Z register 214. Output of 213 will pass through OR 240 to delay 239 and subsequently cause the transfer of the Z register 214 to the storage register 202. As with the key field transfer, the delay is such as to insure that the proper value has been transferred into the Z register 214 before the transfer of the Z register 214 to the SD field of the storage register 202.

At this point in the discussion, it has been shown that the proper values of the SD field and the flag field have been set up by means of the heretofore discussed circuitry. Still to remain, however, is the necessity of writing the count field when lines $d$–$h$ are activated. In some systems the necessary decoding may take that amount of time which would require the magnetic disk to reorient itself before the count field can be properly written. If such be the case, then output $d$–$h$ will activate OR 223 which will indicate that reorientation is necessary and that normal write sequence should be interrupted. If, however, the logic is fast enough so as to set the count field to its proper value, such that it can be written at its proper time, then OR 223 may be used to signal the start of the write sequence.

Assuming that reorientation is needed, ANDs 224, 226, 228, 230 and 232 will also be needed. When reorientation is complete, one leg of the foregoing AND circuits will be activated. The signal for a normal write sequence is initiated such that the count field as now stored in register 202 will be written and the sequence will follow its normal sequence until it is interrupted by the output of either ANDs 225, 227, 229, 231 or 233. If reorientation is not needed, then ANDs 224, 226, 228, 230 and 232 are also not needed and the input to ANDs 225, 227, 229, 231 and 233 from those respective ANDs may be directed from the other input to each of those respective AND circuits.

For the following discussion assume that reorientation has been completed. If output $d$ of status decoder 213 is activated, then AND 224 will be activated and one leg of AND 225 will be activated. When the end of the ECC of the count field has been written, AND 225 will be activated which will cause the normal write sequence to be interrupted and the special gap to be written. Upon the completion of the writing of the special gap, the normal write sequence would then continue. Here as with the read operation, the writing of the special gap can be controlled in the same manner as shown in the first embodiment and it is not felt necessary to redescribe that same logic over again.

The result of output $d$ being activated is to cause a special gap to be written at the end of the ECC field of the count field causing the G2 gap to be moved downtrack from its original expected location.

If output *e* of status decoder 213 is activated, AND 226 is activated which in turn will activate one input of AND 227. The other input line to AND 227 will be activated when the end of the ECC field of the key field has been written which will cause AND 227 to be activated, interrupting the normal sequence of the write operation, causing special gap to be written and upon completion of the special gap being written, the normal sequence would be then continued. This operation effectively causes the special gap to be written at the end of the ECC field which is associated with the key field and moves the G3 gap further down the track and it would normally be located in a normal count-key-data format.

If output *f* of status decoder 213 is activated, AND 228 will be activated causing one arm of AND 229 to be activated. The other input of AND 229 will be activated when the ECC field associated with the data field has been written. When AND 229 is activated, the normal write sequence is interrupted, a special gap is written and upon completion of writing the special gap the normal write sequence is continued. This causes the special gap to be written at the end of the ECC field associated with the data field and effectively moves the G4 gap further down the track than would normally occur in a normal count-key-data format.

If output *g* of status decoder 213 is activated, AND 232 is activated, activating one input to AND 233. The other input to AND 233 is a signal which indicates that the start of writing of the key field has occurred. AND 233 interrupts a normal write sequence and causes Z bytes of the key field to be written. First, the output of AND 233 passes through OR 200 to cause the contents of the Z register 214 to be set into the read/write control circuitry 203, instead of the key length that would have been transferred to control counter 203 under normal sequence of operation. Control counter 203 is decremented after each byte is written and detector 204 indicates when the control counter 203 has reached zero and therefore, that the first portion of the key field has been written. This condition will activate AND 206 which will indicate a write of the special gap and inhibit further ECC generation during the writing of the special gap by setting the inhibit ECC generation flip flop 208. When the special gap has been completed, a signal is inputted such that the inhibit ECC generation flip flop 208 is reset and subtractor 212 performs a subtraction of the key length in the storage register 202 and the value of the first portion of the key field written that is present in the Z register 214. The resulting difference is transferred at a time dictated by the special gap completion signal passing through delay 207 to transfer the contents of the subtractor 212 to the control counter 203. The output of delay 207 also indicates return to normal sequence allowing the continuation in a normal manner of the write operation with the proper value of the remaining key field now being in the control counter such that the key field will be written properly.

When output *h* is activated, AND 230 is activated, activating one input arm of AND 231. The other input arm of AND 231 is activated when a signal is generated indicating that the start of writing of the data field has occurred. When AND 231 is activated, the normal write sequence is interrupted and the first Z bytes of the data field are written. This occurs by having the output of AND 231 pass through OR 200 to transfer the contents of the Z register 214 to the control counter 203. The control counter is decremented 1 for each byte of data that is written and detector 204 indicates when the control counter has equalled zero, indicating that the first portion of the data field (Z bytes of the data field) has been successfully written. AND 205 is therefore activated which causes a write special gap signal to be generated via OR 207 and the inhibit ECC generation flip flop 208 is set. It is necessary to inhibit the ECC generation causing the write of the special gap since it is not desirable to have the information of the special gap fed through the ECC generation circuitry which would give rise to an erroneous correction code. When the special gap has been completed, the inhibit flip flop 208 is reset and subtractor 212 subtracts the data length as set forth in the storage register 202 and the first portion of the data field that was written as set in the Z register. The resulting value is the amount of the data field still to be recorded which is transferred from the subtraction circuitry 212 to the control counter 203 when the special gap completion signal has passed delay 207 initiating that transfer. At the same time, the output of delay 207 causes the write sequence to go back to its normal sequence and the control counter now contains the correct amount of bytes for completing the writing of the data field.

Other Embodiments

Figure 12:
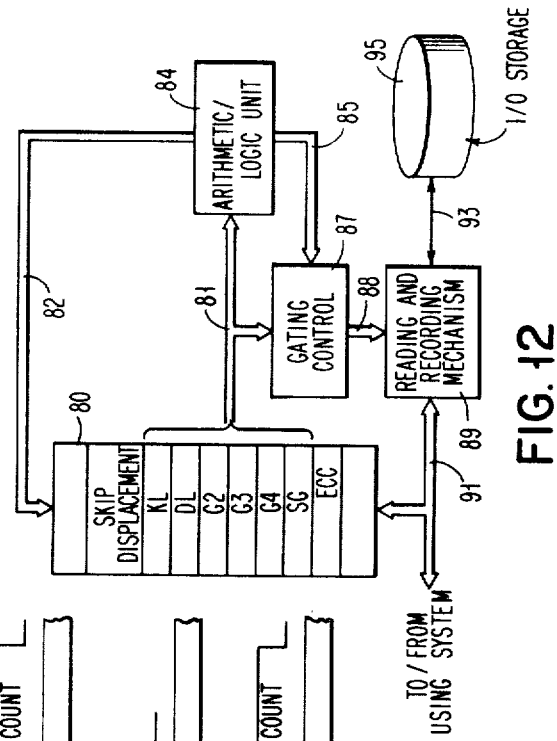
FIG. 12 is a generalized data flow of control apparatus for implementing my invention.

It is realized that the control logic as described for the first and second embodiments may be emulated and the method described with regard to those embodiments may be performed in a microprogrammable machine which has been microprogrammed to perform the method herein described. The basic microprogrammable machine data flow is shown with regard to FIG. 12. There exists within the microprogrammable machine registers 80 for storing the data length DL, key length KL and the constants for the gaps G2, G3, G4, the special gap length, the ECC length and the skip displacement SD. Under control of a read only memory or a writable control store, these values may be manipulated by the arithmetic and logic units 84 to determine the proper values to be written for the SD field and the flag field within the count field herein described with regard to the second embodiment. The read only memory and writable control store will gate the writing of the gaps, in the specific format as dicated by the designer, through gating control 87 to the reading and recording mechanism 89 to the I/O storage 95 via bus 93. The reading and recording mechanism 89 is fed back into the buffer and controlled circuitry via bus 91. In this type of machine, the read only memory or writable control store acts as a highly sophisticated master clock causing the information stored in the different registers to be manipulated at the proper time to obtain the proper values and for controlling the reading and writing of the special gaps during the normal read/write proceses. It is my understanding that it is well within the art for a microprogrammer to take the teachings of this invention as disclosed in this specification and to microprogram a microprogrammable machine to perform the invention described herein. One such machine which is capable of being so microprogrammed, and has been so microprogrammed, is the IBM 3830 Model 2 Storage Control Unit.

It should further be recognized that the apparatus and method described in this specification can be easily adapted to avoid more than one defect per track. The manner in which this is done is to initialize the medium with a series of defect displacement fields recorded after the reference mark such that each field will represent the distance either between the reference mark and the defect or in the alternative between the reference mark and the first defect and thereafter between adjacent defects. The control field written would be necessity also have to have the same number of defect dislacement sections. The apparatus would need only be modified to treat the defects in sequence such that the defect being treated would appear as the only defect on the track.

With regard to the specific embodiment concerning the count-key-data format, the count field would contain a skip displacement section and a connected flag bit in the flag section for each defect. The number of skip displacement sections would be equal to the number of defects to be avoided. Again, the specific teachings of the apparatus and method as taught herein may be used.

Although my invention has been particularly shown and described with reference to the preferred embodiments thereof, it will be understood by those skilled in the art that the foregoing and other changes in form and details may be made therein without departing from the spirit and scope of the invention.

I claim:

1. Apparatus for avoiding a defect in a data track on the recording media in a storage system, the recording media having an actual recording length L and a permissible data recording length of L-3, wherein B is a dedicated special gap, the recording media having been initialized prior to use with this apparatus to have recorded thereon, in a recognizable position in each data track of the recording media, a control field defining the distance from a reference point on the recording media within that track to an end point, where the end point has a fixed spatial relationship to the defect affecting that track, the storage system having at least one transducer in operable transducing relationship with the recording media for recording information on or reading information from the recording media, the apparatus comprising:
   first means for generating, during a read or write operation for a record R(n), a value of the defect distance for the next sequential record R(n+1), said second means' output providing as input to said first means;
   second means connected to said first means for storing the defect distance for record R(n+1), said second means' output providing as input to said first means;
   third means connected to said second means for generating an output signal when record R(n+1) is affected by a defect, said signal being generated at the beginning of a normal write operation of the storage system for recording record R(+1);
   fourth means connected to said second means for controlling the transfer of the defect distance stored in said second means for recording the defect distance into the control field of record R(n+1) during the writing of the control field for record R(n+1) on the recording media by the storage system;
   fifth means connected to said second and said third means for controlling the interruption of the normal write operation of record R(n+1) and for the placement of a special gap onto the storage media during the interrupt period, said fifth means interrupting the normal write operation at an avoidance point with respect to record R(n+1) for preventing the defect from affecting the data being recorded with respect to record R(n+1) by placing the special gap about the defect on the recording media, the size of said special gap being greater than the maximum size of an allowable defect to be avoided by this apparatus and less than the distance B;
   sixth means responsive to the completion of the placement of the special gap for returning control to the storage system for continuation of the normal write operation for the completion of the recording of record R(n+1);
   seventh means for storing the defect distance recorded in a controlled field of each record when a record is read during a read operation, the output of said seventh means serving as an input to said first means during a read operation;
   eight means connected to said seventh means for determining from the stored defect distance within said seventh means whether that record being read contains a special gap placed therein;
   ninth means connected to said seventh and eighth means for controlling the interruption of the normal read operation of the record being read at a time when said special gap will pass beneath the reading transducer of the storage system; and
   tenth means responsive to the end of the special gap passing beneath the transducer of the storage system for returning control to the storage system for continuing the normal read operation for completing the reading of said record.

2. Apparatus for avoiding a defect in a data track on the recording media in a storage system during a read operation of the storage system, the recording media having an actual recording length L and a permissible data recording length of L-B, wherein B is a dedicated special gap, the recording media having been initialized prior to use with this apparatus to have recorded thereon in a recognizable position in each data track of the recording media the distance from a reference point on the recording media within that track to an end point, where the end point has a fixed spatial relationship to the defect affecting that track the storage system having at least one transducer in operable transducing relationship with the recording media for recording information on or reading information from the recording media, the apparatus comprising:
   first means for storing the defect distance recorded in a controlled field of each record when a record is read during a read operation;
   second means connected to said first means for determining from the stored defect distance within said first means whether that record being read contains a special gap recorded therein;
   third means connected to said first and second means for controlling the interruption of the normal read operation of the record being read at a time when said special gap will pass beneath the reading transducer of the storage system; and
   fourth means responsive to the end of the special gap passing beneath the transducer of the storage system for returning control to the storage system for continuing the normal read operation for completing the reading of said record.

3. Apparatus for avoiding a defect in a data track on the recording media in a storage system, the recording media having an actual recording length L and a permissible data recording length of L-B, wherein B is a dedicated special gap, the recording media having been initialized prior to use with this apparatus to have recorded thereon in a recognizable position in each data track of the recording media the distance from a reference point on an end point, where the end point has a fixed spatial relationship to the defect affecting that track, the storage system having a transducer for scanning said data track in operable transducing relationship, each record recorded being composed of two or more fields with gaps separating each field within a record and adjacent records, the first field in each record being a control field which contains a defect or skip displacement section, a flag section indicating which field, if any, is affected by a defect, and the length of each subsequent field in the record, said apparatus comprising:

a first storage means for storing the control field of each record R($n$) as that record R($n$) is read by the storage system;

decoding means for decoding the defect displacement section and the flag section of the control field for record R($n$) stored in the first storage means so as to determine (1) if record R($n$) contains a special gap B for defect avoidance and (2) when that special gap is specifically located in record R($n$) if a special gap is written in recordR($n$);

interrupting means connected to the first storage means and the decoding means for interrupting the normal read sequence for record R($n$) during that period when the special gap passes beneath said transducer;

a first defect distance generating means for generating a value for the defect distance for the next sequential record R($n$+1), in anticipation that the operation for record R($n$+1) will be a write operation;

a second storage means for storing the generated value of the defect distance for record R($n$+1);

a third storage means for storing a control field for record R($n$+1) during a write operation for record R($n$+1);

formatting means connected to the second and third storage means for determining if record R($n$+1) will be affected during a write operation by a defect on the track, the formatting means generating proper values for the defect distance section and flag section of the control field for record R($n$+1) such that the defect will not affect data recorded for record R($n$+1);

transfer means for transferring the generated value for the defect displacement section and flag section of the control field from the formatting means to the proper respective sections of the control field for record R($n$+1) in the third storage means;

second interrupting means connected to the formatting means for interrupting the write operating for record R($n$+1) during the period so as to allow a special gap to be placed about the defect on the recording means so as to prevent information of record R($n$+1) from being adversely affected by the defect;

second defect distance generating means connected to the second means and the formatting means for generating a value for the defect distance for the next sequential record R($n$+2) in anticipation that the operation for record R($n$+2) will be a write operation, the generated value of the defect distance being stored in the second storage.

4. Apparatus for avoiding a defect in a data track on a recording media in a system which uses the count-key-data format, the recording media having an actual recording length L and a permissible data recording length of L-B, wherein B is a dedicated special gap, the recording media having been initialized prior to use with this apparatus to have recorded thereon after index in each data track on the recording media, the distance from index on the recording media within that track to an endpoint where the endpoint has a fixed spatial relationship with the defect affecting that track, the storage system have a transducer for scanning said data track in operable transducing relationship with the recording media for recording information on and reading information from the recording media, the count field of each record being comprised of a defect or skip displacement section, a flag section indicating which field, the key or data field of record R($n$) or the count field of record R($n$+1), if any, is affected by a defect, the length of the key field, and the length of the data field, said apparatus comprising:

a first storage means for storing the count field of each record R($n$) as that record R($n$) is read by the storage system;

decoding means for decoding the defect displacement section and the flag section of the count field for record R($n$) stored in the first storage means so as to determine (1) if record R($n$) contains a special gap B for defect avoidance and (2) where that special gap is specifically locatedwithin record R($n$) if a special gap is within R($n$);

interrupting means connected to the first storage means and the decoding means for interrupting the normal read sequence for record R($n$) during the reading of the special gap by the transducer of the storage system;

a first defect distance generating means for generating a value for the defect distance for the next sequential record R(+1), in anticipation that the operation for record R($n$+1) will be write operation;

a second storage means for storing the generated value of the defect distance for record R($n$+1);

a third storage means for storing a count field for record R($n$+1) as received by the storage system from the record source for a write operation;

formatting means connected to the second and third storage means for determining if record R($n$+1) will be affected during the write operation by a defect on the track, the formatting means generating proper values for the defect distance section and flag section of the count field for record R($n$+1) such that a special gap will be recorded about the defect if the defect affects record R($n$+1);

transfer means for transferring the generated value of the defect displacement section and flag section of the count field for record R($n$+1) from the formatting means to the proper respective sections of the count field for record R($n$+1) in the third storage means;

second interrupting means connected to the formatting means for interrupting the write operation for record R($n$+1) during the period so as to allow a special gap to be written about the defect on the recording means so as to prevent information of record R($n$+1) from being adversely affected by the defect;

second defect distance generating means connected to the second means in the formatting means for generating a value for the defect distance for the next sequential record R(n+2) in anticipation that the operation for record R(n+2) will be a write operation, the generated value of the defect distance being stored in the second storage means.

5. The apparatus as set forth in claim 4 wherein the second interrupting means further comprises;

decision means for determining whether a defect which would normally occur in either the key field or data field of record R(n + 1) will be most efficiently avoided by (1) the moving of the entire key or data field or (2) the dividing of the key or data field into two parts about the defect and recording between the divided parts the special gap, the decision means further determining if the count field for record R(r + 2) would be affected by the defect;

the formatting means generating a value of the defect distance to be equal to zero and the flag bits associated with the key field, the data field of record R(n + 1) and the count field of record R(n + 2) respectively to be set to zero, where the defect has occurred prior to the writing of record R(n + 1);

the formatting means generating a value of the defect displacement to be equal to zero and a value of 1 to be associated with the flag bit within the flag section to indicate which of the fields have been moved so as to avoid the defect;

The formatting means setting the value of the defect displacement field to the value stored in the second storage means and setting all flag bits for the fields in the flag section to zero when the defect can affect subsequent records to record R(n + 1) but does not affect record R(n + 1) or the count field of record R(n + 2);

the formatting means generating a value for the defect displacement section equal to the length of information to be recorded from the start of the key or data field to the start of the writing of the special gap and setting the flag bit associated with the key field or data field if the decision means has indicated the key or data field will be divided into two parts;

the formatting means further comprising a remainder means for determining the value of the remaining portion of the key field or data field of record R(n + 1) to be written after the special gap has been written about the defect when the key or data field has been divided into two parts, the value generated by the remainder means being the data length remaining to be written by the storage system for record R(n + 1) upon the completion of the writing of the special gap.

6. In a system for writing variable-length records onto the tracks of a storage medium, each track being susceptible to a defect, the system comprising:

means for writing a record Y onto a track;

first means for determining the distance $m$ available for record writing between a defect on the track to a reference point within a record X already written on the track;

second means for ascertaining the length $n$ of track necessary for writing record Y thereon; and third means responsive to signals from the first and second means for causing the writing means to suspend writing record Y along a portion of the track extent inclusive of the defect, if said signals indicate that $m < n$.

7. In a system for writing variable-length records on a medium having recording tracks, each track of which is susceptible to having a defect disposed at a predetermined variable distance $m$ available for record writing from a reference point on the track, the system comprising:

means for writing a record Y on the track;

first means for determining the predetermined distance $m$;

second means for ascertaining the length $n$ of the track necessary for writing record Y thereon; and third means for controlling the writing means responsive to signals from the first and second means for causing record Y to be written before the defect if $m > n$, after the defect if $m = n$ and on either side of the defect if $m < n$.

8. In a system according to claim 7 wherein:

the third means further includes means for causing the writing means to suspend writing along a portion of the track extent inclusive of the defect.

9. A method for recording data records on a storage medium having at least one defective area disposed along a continuous data track comprising the steps of:

recording data records along said data track;

recording control information at the beginning of a data record in a special gap, said control information defining the distance from a reference point on said data track to a defective area existing along the track on which said record is to be recorded; and monitoring said control information during recording for recording at least one portion of said data record in a divided pattern, so that no part of said data record is registered over the defective area.

* * * * *

UNITED STATES PATENT AND TRADEMARK OFFICE
CERTIFICATE OF CORRECTION

PATENT NO. : 3,997,876
DATED : December 14, 1976
INVENTOR(S) : Donald I. Frush

It is certified that error appears in the above-identified patent and that said Letters Patent are hereby corrected as shown below:

In col. 23, line 30 change "L-3" to --L-B--

In col. 23, line 45 after R(n+1) add --the defect distance being defined from a constant fixed point within each record to said defined end point being used in conjunction with defects in the recording media;--

In col. 23, delete lines 46 and 47.

In col. 23, line 56 change "R(+1)" to --R(n+1)--

In col. 25, line 56 change "operating" to --operation--

In col. 26 line 39 change "R(+1)" to --R(n+1)--

In col. 27, line 18 change "R(r+2)" to --R(n+2)--

Signed and Sealed this

First Day of March 1977

[SEAL]

Attest:

RUTH C. MASON
*Attesting Officer*

C. MARSHALL DANN
*Commissioner of Patents and Trademarks*